(12) United States Patent
Byrne

(10) Patent No.: US 7,299,693 B2
(45) Date of Patent: Nov. 27, 2007

(54) METHOD AND APPARATUS FOR MONITORING TIRE PERFORMANCE INCLUDING SLIPPAGE

(75) Inventor: Francis J. Byrne, Medina, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 11/501,855

(22) Filed: Aug. 10, 2006

(65) Prior Publication Data
US 2006/0282208 A1    Dec. 14, 2006

Related U.S. Application Data

(62) Division of application No. 11/030,813, filed on Jan. 7, 2005, now Pat. No. 7,114,383.

(51) Int. Cl.
*G01M 17/02* (2006.01)

(52) U.S. Cl. .................................................. 73/146

(58) Field of Classification Search ....... 73/146–146.8; 340/442–447
See application file for complete search history.

(56) References Cited

U.S. PATENT DOCUMENTS

| | | | |
|---|---|---|---|
| 3,770,040 A | 11/1973 | DeCicco | |
| 5,578,813 A | 11/1996 | Allen et al. | |
| 5,644,139 A | 7/1997 | Allen et al. | |
| 5,786,804 A | 7/1998 | Gordon | |
| 5,964,265 A | 10/1999 | Becherer | |
| 6,030,478 A | 2/2000 | Koch et al. | |
| 6,161,431 A * | 12/2000 | Drahne et al. | 73/146 |
| 6,281,882 B1 | 8/2001 | Gordon et al. | |
| 6,286,573 B1 | 9/2001 | Hine | |
| 6,293,140 B1 * | 9/2001 | Lohberg | 73/146 |
| 6,386,251 B1 | 5/2002 | Koch et al. | |
| 6,396,479 B2 | 5/2002 | Gordon | |
| 6,433,780 B1 | 8/2002 | Gordon et al. | |
| 6,550,320 B1 * | 4/2003 | Giustino | 73/146 |

(Continued)

FOREIGN PATENT DOCUMENTS

DE          DD 288570          4/1991

(Continued)

OTHER PUBLICATIONS

Smartire, Full Function Display User's Manual; http://Smartire.com, ©2004.

(Continued)

*Primary Examiner*—Andre J. Allen
*Assistant Examiner*—Jermaine Jenkins
(74) *Attorney, Agent, or Firm*—James A. Oliff; Thomas R. Kingsbury

(57) ABSTRACT

A method and apparatus for assessing tire performance by generating accurate, timely tire-to-surface slippage information under any operational/environmental conditions and on any road and/or off-road surface without requiring instrumentation of the roadway. The approach is capable of storing generated tire-to-surface slippage information for later retrieval and analysis and/or capable of supporting dynamic, real-time collection and dissemination of generated data. One exemplary embodiment generates and disseminates tire-to-surface slippage information in real-time that is compatible with and may be formatted for use by any consumer vehicle control system as well as external test and analysis equipment.

10 Claims, 10 Drawing Sheets

U.S. PATENT DOCUMENTS

| | | |
|---|---|---|
| 6,637,276 B2 | 10/2003 | Adderton et al. |
| 6,591,671 B2 * | 12/2003 | Kin et al. .................. 73/146.5 |
| 6,662,097 B2 * | 12/2003 | Kin et al. ..................... 701/80 |
| 6,668,666 B1 | 12/2003 | Chen et al. |
| 6,709,138 B1 | 3/2004 | Johnson |
| 6,923,050 B2 * | 8/2005 | Levy et al. ................... 73/146 |
| 2002/0095980 A1 | 7/2002 | Breed et al. |
| 2003/0167832 A1 | 9/2003 | Novak et al. |
| 2003/0201044 A1 | 10/2003 | Schick |
| 2004/0112128 A1 | 6/2004 | Liebemann et al. |

FOREIGN PATENT DOCUMENTS

JP     2002131030 A   *   5/2002

OTHER PUBLICATIONS

Tire Pressure Monitoring System Owner's Manual; http://Smartire.com, ©2004.

* cited by examiner

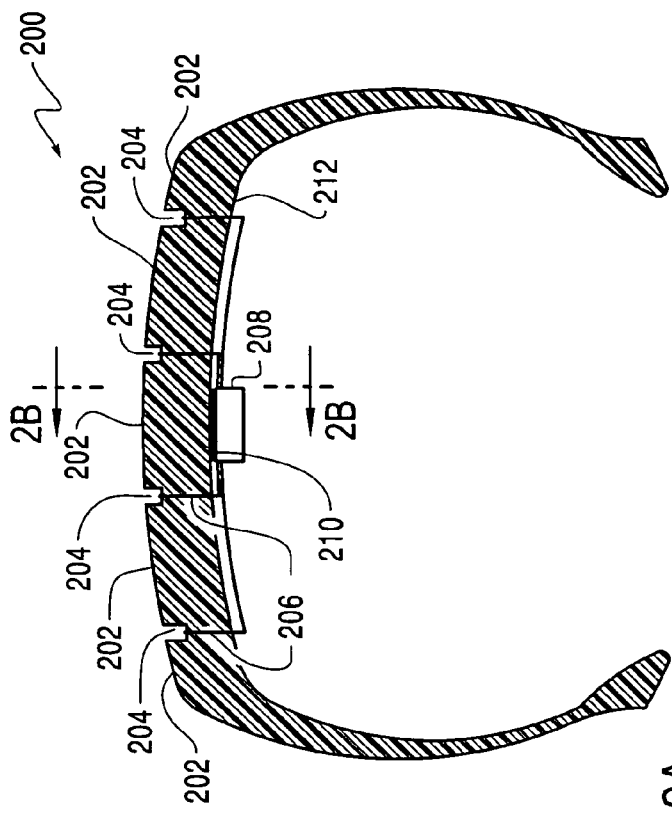
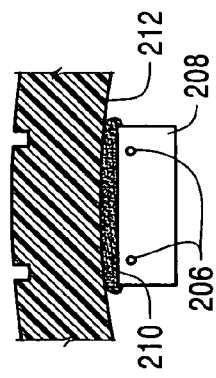
FIG. 2A
FIG. 2B
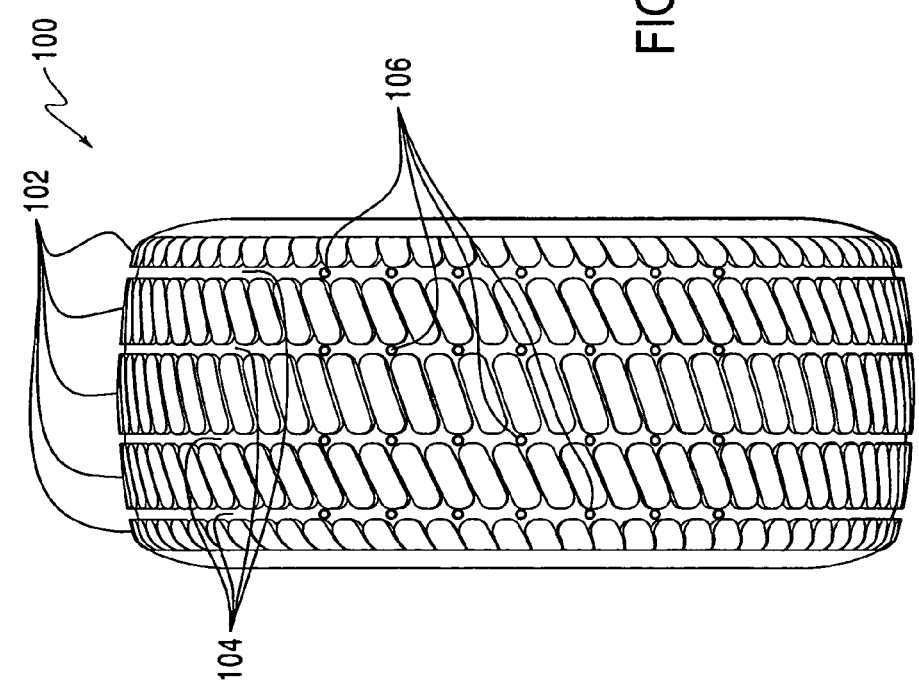
FIG. 1

METHOD AND APPARATUS FOR MONITORING TIRE PERFORMANCE INCLUDING SLIPPAGE

This is a Division of application Ser. No. 11/030,813 filed Jan. 7, 2005 now U.S. Pat. No. 7,114,383. The disclosure of the prior application is hereby incorporated by reference herein in its entirety.

BACKGROUND OF THE INVENTION

1. Field of Invention

The present invention pertains to vehicle tire performance monitoring. In particular, the present invention pertains to monitoring slippage between a vehicle tire and a road or off-road surface.

2. Description of Related Art

Slippage between the tread blocks of a vehicle's tires and the surface upon which the vehicle is operating greatly affects overall tire and vehicle performance. For example, slippage of a tire against a road or off-road surface typically results in tire tread wear and a reduced operational life of the tire. Further, slippage of a tire against a road or off-road surface results in a loss of torque generated by the vehicle engine and power train, resulting in less efficient operation of the vehicle. Slippage also results in a loss of vehicle maneuverability in that a vehicle may fail to hold to the surface upon which the vehicle is operating, thereby causing the driver to limit the range of operational maneuvers performed in the vehicle. In a worst case scenario, slippage of one or more tires against a road or off-road surface can result in a loss of vehicle control which may result in an accident.

Unfortunately, accurate slippage information of a tire upon a road surface under a variety of operational and environmental conditions has, traditionally, been very difficult to obtain. One conventional approach is to place instruments within a test road surface itself. For example, one approach is to install within a test road surface a steel plate with a hole in the steel plate through which an instrumented needle protrudes above the surface of the plate. A test vehicle is driven along the test road surface and over the steel plate containing the instrumented needle. As a tire on the vehicle contacts the needle, the needle moves in the direction of slippage. A measure of the slippage may thereby be recorded by the needle's instrumentation.

One drawback associated with such an approach is that you can only collect data on a single point on the road surface and not on the tire itself. Therefore, although information is collected, it is unknown whether the information collected relates to a point at the front of the tire footprint or the back of the tire footprint. Such a drawback may be mitigated by using a plate that includes a matrix of instrumented needles. Although such an approach provides increased information over the footprint of the tire, the surface for which the measurements are collected remain measurements for slippage on the steel plate surface rather than the actual road surface. Further, it is difficult to use such an approach to determine slippage under a wide range of maneuvers due to the need to place one or more plates in a manner that allows the maneuver to be performed while the vehicle is over the steel plates. Still further, such an approach is not effective for measuring slippage under certain environmental conditions, such as snow, ice, and mud, nor can such an approach be used to measure slippage in off-road environments. In addition, efforts to collect slippage information using such instrumented plate techniques is typically very repetitious and time consuming. The results generated are often incomplete, error prone and/or ambiguous.

SUMMARY OF THE INVENTION

The need for tire slippage information is widespread. For example, tire manufacturers need slippage information in order to verify that a set of tires meets original equipment manufacturer (OEM) specification requirements when a set of the tires are mounted upon a new vehicle. Further, tire manufacturers need slippage information to assess and to fine-tune the performance of aftermarket as well as OEM lines of tires for road and off-road vehicles as well as tires used by heavy equipment such as earth movers and large trucks used in the construction, forestry and mining industries.

Slippage information can also be used to optimize the performance of a vehicle/tire combination for a specific set of operating conditions. For example, tire slippage information measured for a racing vehicle during trial laps on a specific race track may be used to select an optimal set of tires for that racing vehicle on that particular track. Further, such slippage information can be used to adjust the suspension of the racing vehicle prior to the race in order to minimize slippage at key locations on the race track. Given that in competitive, high-stakes races the difference between first place and third place may only be a matter of hundredths of a second, optimizing a vehicle prior to the race to reduce slippage without significantly degrading other performance criteria (e.g., gas mileage, vibration at high speed, handling, etc.) may be the difference between winning and losing a major race.

Accurate, real-time measurements of actual tire-to-surface slippage information would be of great direct benefit to both the tire and vehicle industries as well as the general consumer population. Consumer passenger vehicles currently employ computerized control modules that allow the performance of the vehicle to be controlled, altered or optimized. Engine control systems and anti-lock breaking systems are common in today's vehicles. Such control modules often communicate with and receive command and control information from a vehicle control management system that is responsible for the integration of the functions performed by each of the respective control systems. Stability control systems have recently been introduced that assist in maintaining vehicle stability under difficult driving conditions. Although such control systems would benefit greatly from accurate, real-time measurements of actual tire-to-surface slippage information, such information is not currently available for their use. As a result, the capabilities of such systems are often limited with respect to the level of optimization that can be achieved.

Hence, a need remains for a method and apparatus for collecting and disseminating accurate measurements of tire-to-surface slippage information. The approach should support the collection of accurate, timely tire-to-surface slippage information under any operational/environmental condition and on any road and/or off-road surface without requiring instrumentation of the roadway. The approach should be capable of storing generated tire-to-surface slippage information for later retrieval and analysis and/or should be capable of dynamic, real-time collection and dissemination of generated data. Preferably the approach would generate tire-to-surface slippage information in real-time that is compatible with and may be dynamically formatted for use by consumer vehicle control systems as well as external test and analysis equipment.

An exemplary embodiment of the present invention provides a method and apparatus for generating accurate, timely tire-to-surface slippage information under any operational/ environmental condition and on any road and/or off-road surface without requiring instrumentation of the roadway. The approach is capable of storing generated tire-to-surface slippage information for later retrieval and analysis and is capable of supporting dynamic, real-time collection and dissemination of generated data. One exemplary embodiment generates and disseminates tire-to-surface slippage information in real-time that is compatible with and may be dynamically formatted for use by any consumer vehicle control system as well as external test and analysis equipment.

In a first exemplary embodiment of the invention, a method for monitoring slippage of a tire contact area against a surface is described that includes generating a reference frame of the surface in contact with a portion of the tire contact area, generating a sample frame of the surface in contact with the portion of the tire contact area and comparing the reference frame with the sample frame to determine whether the portion of the tire contact area has moved relative to the surface.

In a second exemplary embodiment of the invention, an apparatus is described for monitoring slippage of a tire contact area against a surface that includes a sensor module that generates a reference frame of the surface in contact with a portion of the tire contact area and subsequently generates a sample frame of the surface in contact with the portion of the tire contact area and a processor module that compares the reference frame with the sample frame to determine whether the portion of the tire contact area has moved relative to the surface.

In a third exemplary embodiment of the invention, a program product apparatus is described having a computer readable medium with computer program logic recorded thereon for monitoring slippage of a tire contact area against a surface that includes a sensor module that generates a reference frame of the surface in contact with a portion of the tire contact area and subsequently generates a sample frame of the surface in contact with the portion of the tire contact area and a processor module that compares the reference frame with the sample frame to determine whether the portion of the tire contact area has moved relative to the surface.

In a fourth exemplary embodiment of the invention, a method for determining an amount of wear of a tire tread is described that includes recording a first signal propagation time for a signal to travel along a path that includes a distance from the bottom of a tire groove to a surface in contact with the tire tread, recording a second signal propagation time for a signal to travel along a path that includes a distance from the bottom of the tire groove to a surface in contact with the tire tread and determining the amount of wear of the tire tread based upon a comparison of the first propagation time with the second propagation time.

The above features and advantages of the present invention will become apparent upon consideration of the following descriptions and descriptive figures of specific exemplary embodiments thereof. While these descriptions go into specific details of the invention, it should be understood that variations may and do exist and would be apparent to those skilled in the art based on the descriptions herein.

BRIEF DESCRIPTION OF THE DRAWINGS

FIG. 1 is a perspective view of a front, or tread, view of an automobile tire that has been equipped with slippage monitoring sensors in accordance with an exemplary embodiment of the present invention.

FIGS. 2A and 2B are cross-sectional views of an automobile tire that has been equipped with slippage monitoring sensors in accordance with a first exemplary embodiment of the present invention.

DETAILED DESCRIPTION OF PREFERRED EMBODIMENTS

Figure 3:
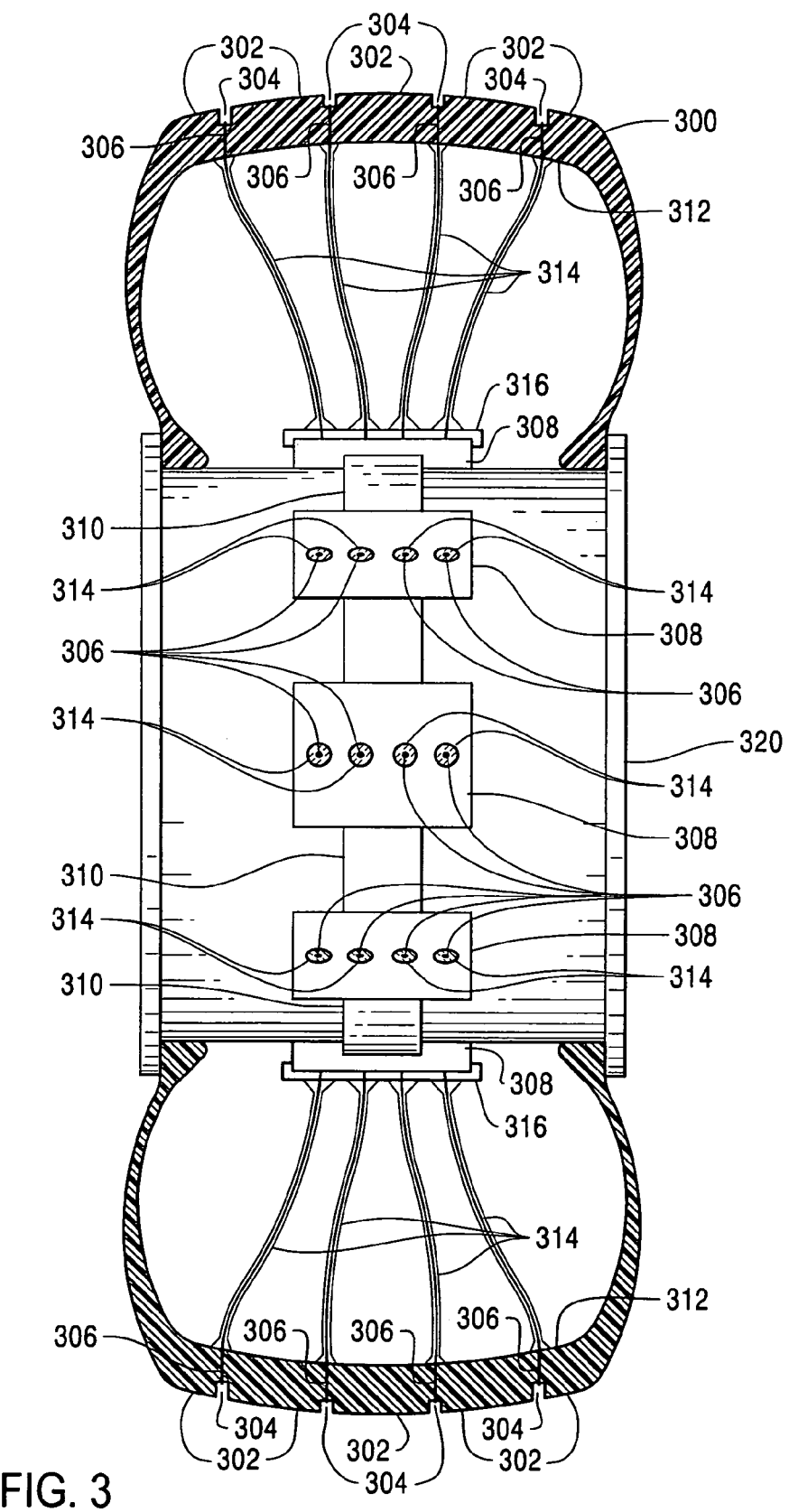
FIG. 3 is a cross-sectional view of an automobile tire and wheel rim that has been equipped with slippage monitoring sensors in accordance with a second exemplary embodiment of the present invention.

Exemplary embodiments according to the present invention are described below with reference to the above drawings, in which like reference numerals designate like components.

Exemplary embodiments of the present invention relate to a novel method and apparatus for generating and disseminating tire-to-surface slippage information.

FIG. 1 presents a perspective view of a front, or tread, view of an automobile tire that has been equipped with slippage monitoring sensors. As shown in FIG. 1, tire 100 may include a plurality of tire tread surfaces 102 separated by tire tread groves 104. As further shown in FIG. 1, a plurality of slippage monitoring sensor optical fibers 106 may be mounted from within the tire so that the tip of an optical fiber associated with each slippage monitoring sensor 106 is flush with a surface of one or more of tire tread groves 104.

Placement of slippage monitoring sensor optical fibers 106 within tire tread groves protects the slippage monitoring sensor optical fibers from damage due to contact with the road surface. Although dirt may temporarily fill a tire grove, tires are typically designed so that debris does not stay permanently lodged in the tire groves.

Sensor optical fibers 106 may be placed anywhere within tire 100 in any number and density. For example, one or more slippage monitoring sensor optical fibers 106 may be placed within a selected tire grove, or across multiple tire groves. The slippage monitoring sensor optical fibers 106 may be placed along the entire periphery of the tire or within a portion of the tire periphery. Sensor optical fibers 106 may also be placed within one or more tread blocks of tire tread surfaces 102, slightly recessed from the outer surface of the tread blocks. Such placement may be useful for assessing tire performance under controlled development and/or test conditions in which the surface is free of debris which may otherwise block the view of the sensor optical fibers 106.

FIG. 2A is a cross-sectional views of an automobile tire that has been equipped with slippage monitoring sensors in accordance with an exemplary first embodiment. As shown in FIG. 2A, tire 200 may include a plurality of tire tread surfaces 202 separated by tire tread groves 204. As further shown in FIG. 2A, a plurality of slippage monitoring sensor optical fibers 206 may be mounted from within the tire so that the tip of optical fibers associated with each slippage monitoring sensor 206 is flush with a surface of one or more tire tread groves 204.

As further shown in FIG. 2A, one or more slippage monitoring sensor optical fibers 206 may be fed into a slippage monitoring module 208 that is mounted to the interior surface 212 of tire 200 by a strong and flexible cushion of adhesive 210 (such as a silicon based adhesive). Although not shown in FIG. 2A, slippage monitoring sensor optical fibers 206 may also be cushioned by and adhered to interior surface 212 of tire 200 by a strong and flexible cushion of adhesive 210. In this manner, both slippage monitoring module 208 and the one or more slippage monitoring sensor optical fibers 206 may be protected from damage due to centrifugal forces generated by rotation of tire 200. The flexible cushion formed by adhesive 210 also protects slippage monitoring module 208 and the one or more slippage monitoring sensor optical fibers 206 from forces due to flexing of tire 200 in response to uneven road and off-road surfaces while the tire is in operational use.

FIG. 2B is a cross-sectional view of the tire presented in FIG. 2A along the line marked 2B. As shown in FIG. 2B, slippage monitoring module 208 may be cushioned by flexible cushion of adhesive 210. Further, slippage monitoring sensor optical fibers 206 may enter slippage monitoring module 208 close to the interior tire surface 212, thereby providing slippage monitoring sensor optical fibers 206 with maximum structural support from flexible cushion of adhesive 210 and interior surface 212 to minimize damage to slippage monitoring sensor optical fibers 206 due to centrifugal forces and forces due to tire impacts with road surfaces.

FIG. 3 is a cross-sectional view of an automobile tire 300 and the outer surface of a wheel rim 320 exposed by removing half of tire 300. As shown in FIG. 3, tire 300 may include a plurality of tire tread surfaces 302 separated by tire tread groves 304. As further shown in FIG. 3, a plurality of slippage monitoring sensor optical fibers 306 may be mounted from within the tire so that the tip of an optical fiber associated with each slippage monitoring sensor 306 is flush with a surface of one or more of tire tread groves 304. One or more slippage monitoring modules 308 may mounted to the outer surface of wheel rim 320 by a strap 310. Strap 310 may be made of any material sufficiently resistant to stretching and loosening as a result of centrifugal forces applied to the strap and one or more slippage monitoring modules 308 as a result of operational use of the wheel and tire.

Slippage monitoring sensor optical fibers 306 may be structurally supported against centrifugal forces and impact forces by a structural sheath 314. Each structural sheath 314 may adhere to interior surface 312 of tire 300 around a slippage monitoring sensor optical fiber 306 and further may adhere to the exterior and/or interior surface of a connector clip 310 that fastens to the top of slippage monitoring module 308, thereby connecting one or more slippage monitoring sensor optical fibers 306 to the top of slippage monitoring module 308.

As described above, strap 310 may be used to hold one or more slippage monitoring modules 308 to the exterior of wheel rim 320 and each slippage monitoring module 308 may support one or more slippage monitoring sensor optical fibers 306. These fibers may be configured to attach to automobile tire 300 at any point in order to collect tire-to-surface slippage information at the specific location selected.

Figure 4:
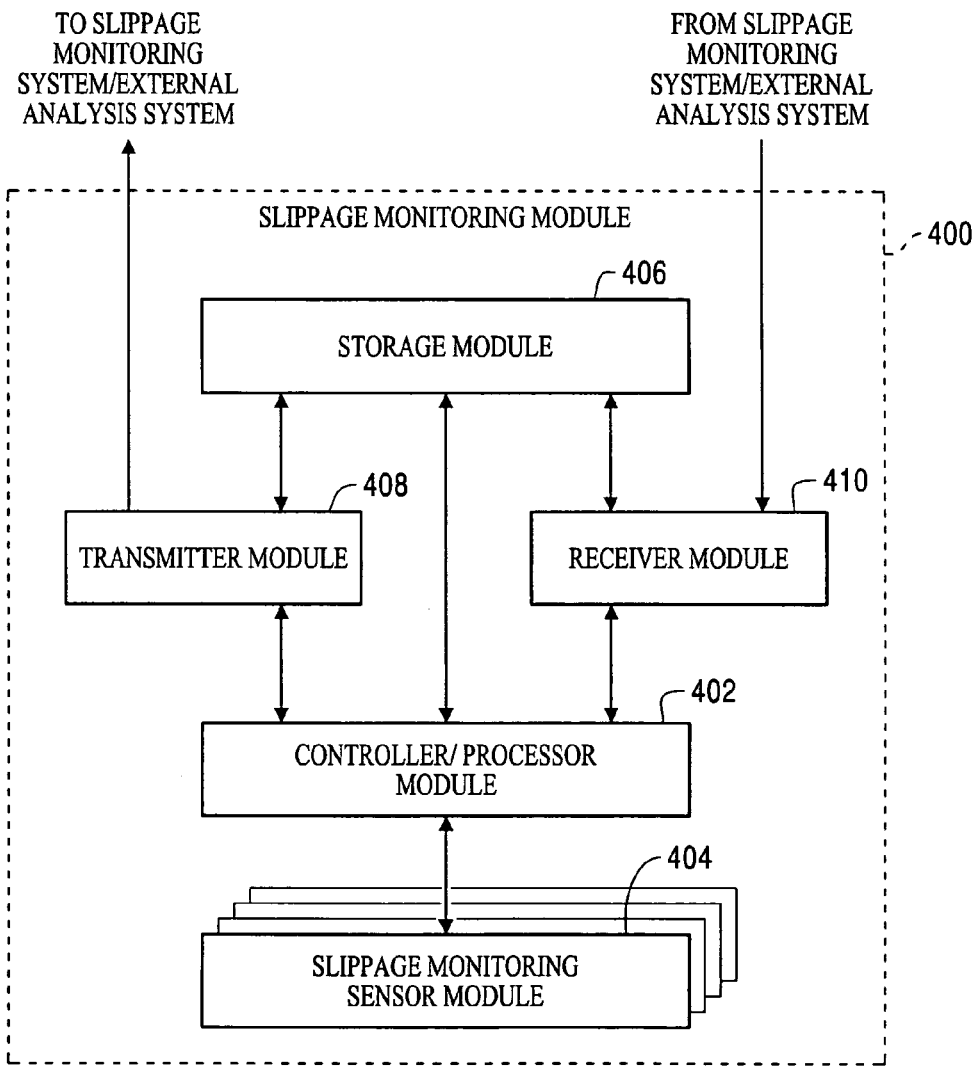
FIG. 4 is a modular block diagram of a slippage monitoring module in accordance with an exemplary embodiment of the present invention.

FIG. 4 presents a block diagram of an exemplary embodiment of a slippage monitoring module 400 that supports collection of tire-to-surface slippage information. As shown in FIG. 4, slippage monitoring module 400 may include a controller/processor module 402 in communication with one or more slippage monitoring sensor modules 404. Slippage monitoring module 400 may further include a storage module 406, a transmitter module 408, and a receiver module 410. Each of these modules may communicate with storage module 406, either directly or via controller/processor module 402.

As described in greater detail with respect to FIG. 7, below, each slippage monitoring sensor module 404 is capable of illuminating and capturing images of a portion of a road or off-road surface within the footprint of a tire. As described in greater detail with respect to FIG. 5, below, controller/processor module 402 controls each slippage monitoring sensor module 404 within monitoring module 400 to generate reference and sample images. Controller/processor module 402 further performs correlation processing to determine the degree of change in the images. The generated correlation information may be used to determine whether slippage has occurred and may be used to determine the magnitude and direction of the slippage, if slippage has occurred.

In one exemplary embodiment, controller/processor module 402 may store generated correlation data and/or slippage information in storage module 406. Stored correlation data and/or slippage information may remain in storage module 406 until a user requests transfer of the data to an external analysis system. In such an exemplary embodiment, controller/processor module 402 may receive a request for an upload of data from an external analysis system via receiver module 410. In response, controller/processor module 402 may retrieve the requested data from storage module 406 and transmit the retrieved information to the external analysis system via transmitter module 408. Time stamps, or sequence information, included in the correlation data and/or slippage information may allow the external analysis system to observe and analyze the data in a meaningful manner and/or to correlate the generated slippage information with information collected simultaneously by other vehicle sensors.

In another exemplary embodiment, controller/processor module 402 may dynamically transmit correlation data and/or slippage information in real-time or near-real-time to an external analysis system located within the vehicle or within transmitter broadcast range of the vehicle. Controller/processor module 402 may dynamically transmit correlation data and/or slippage information in real-time or near-real-time to a slippage monitoring control module mounted within the chassis of the vehicle. The slippage monitoring control module may further process the received slippage information and may coordinate with other vehicle control modules in an integrated manner, as described below with respect to FIG. 10.

Controller/processor module 402 may control the generation of reference and sample images and generate correlation and slippage information in any manner. One approach for generating correlation values and information related to movement based upon an analysis of reference and sample images is described in U.S. Pat. No. 5,644,139 (or '139 patent) to Allen et al. entitled, "Navigation Technique for Detecting Movement of Navigation Sensors Relative to an Object," the content of which is hereby incorporated by reference in its entirety. Although the technique described in the '139 patent is directed to detection of movement of an optical text scanning device. The same approach may be applied to the detection of movement of a tire relative to a road or off-road surface. The exemplary approach, as described in the '139 patent is described below with respect to FIGS. 5-7 which are based, in whole or in part upon FIGS. 7 and 8 and FIG. 4 of the '139 patent, respectively.

Figure 5:
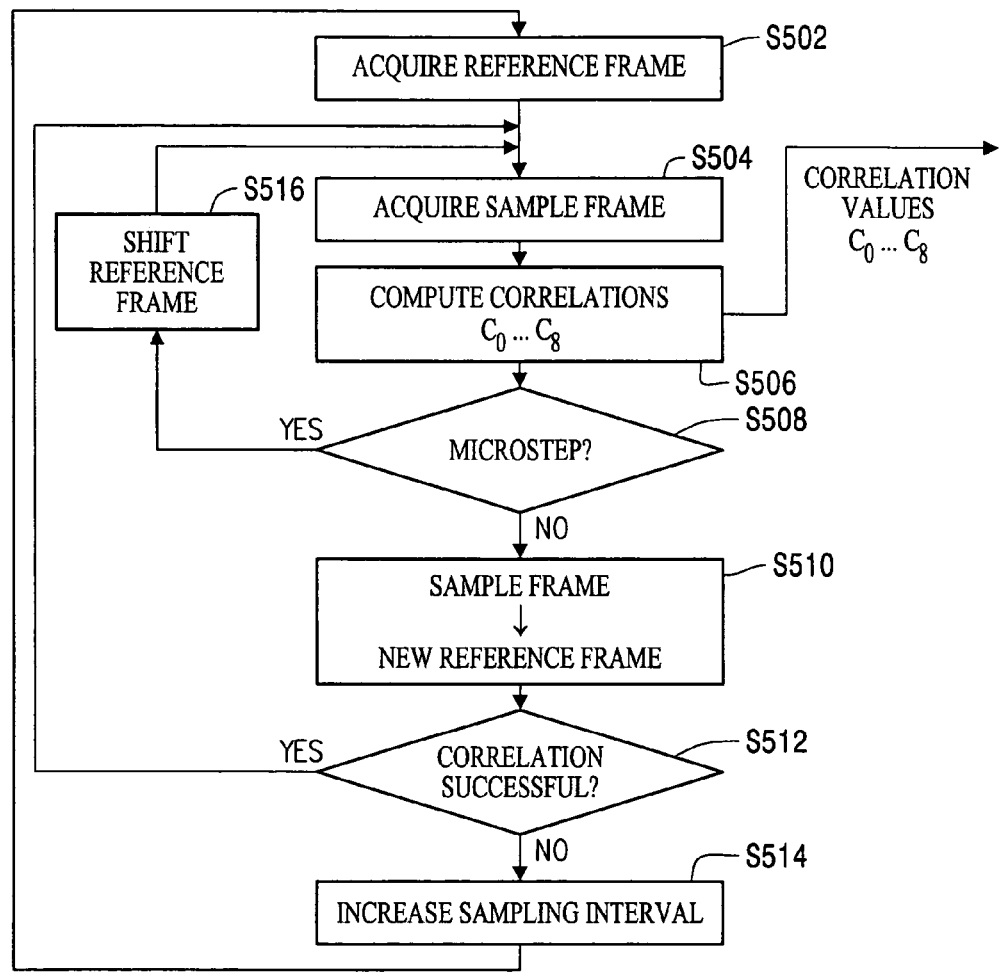
FIG. 5 is a process flow diagram describing a process used by a slippage monitoring module to generate correlation values based upon output received from a slippage monitoring sensor in accordance with an exemplary embodiment of the present invention.

FIG. 5 is a process flow diagram describing a process used by a slippage monitoring module to generate correlation values based upon output received from a slippage monitoring sensor. As shown in FIG. 5, at step S502, controller/processor module 402 (FIG. 4) may instruct a slippage monitoring sensor module 404 to generate and store in storage module 406 a reference image, or reference frame, of the road or off-road surface beneath a slippage monitoring sensor optical fiber connected to slippage monitoring sensor module 404. Next, at step S504, controller/processor module 402 may instruct slippage monitoring sensor modules 404 to generate and store in storage module 406 a sample image, or sample frame, of the road or off-road surface. A sample frame is generated in the same manner as a reference frame, but is taken at a later time.

Once a sample frame has been generated controller/processor module 402 may perform correlation computations, at step S506, as described in greater detail below, to determine a level of correlation between the reference frame and the sample frame. During the correlation process, controller/processor module 402 may compare the image captured in the reference frame and the image captured in the sample frame to determine the amount of slippage, if any, that may have occurred during the time period between the frames. The time interval between the reference frame and the first sample frame, and between each subsequent sample frame and the previous sample frame, may be such that the same image is present in each frame, thus allowing correlation to be successful. The time interval between frames may be pre-set and/or dynamically set so that a feature within a captured image shifts by no more than a single pixel between frames.

If, at steps 506, the correlated images are found to have shifted by a single pixel or less, controller/processor module may determine, at step S508, that a microstep has occurred and the reference frame is shifted, at step 516, by a determined correlation difference and processing may proceed with step S504 and the acquisition of a new sample frame. If, however, at steps 506, the correlated images are found to have shifted by more than a single pixel, controller/processor module may determine, at step S508, that a shift in the image greater than a microstep has occurred and the sample frame may be made the new reference frame, at step S510.

If the controller/processor module determines, at step S512, that the correlation was successful, processing may proceed to step S504 and the acquisition of a new sample frame, otherwise, the controller/processor module may increase the frame sampling interval, at step S514. In such a case, processing may proceed to step S502 and the acquisition of a new reference frame.

Figure 6:
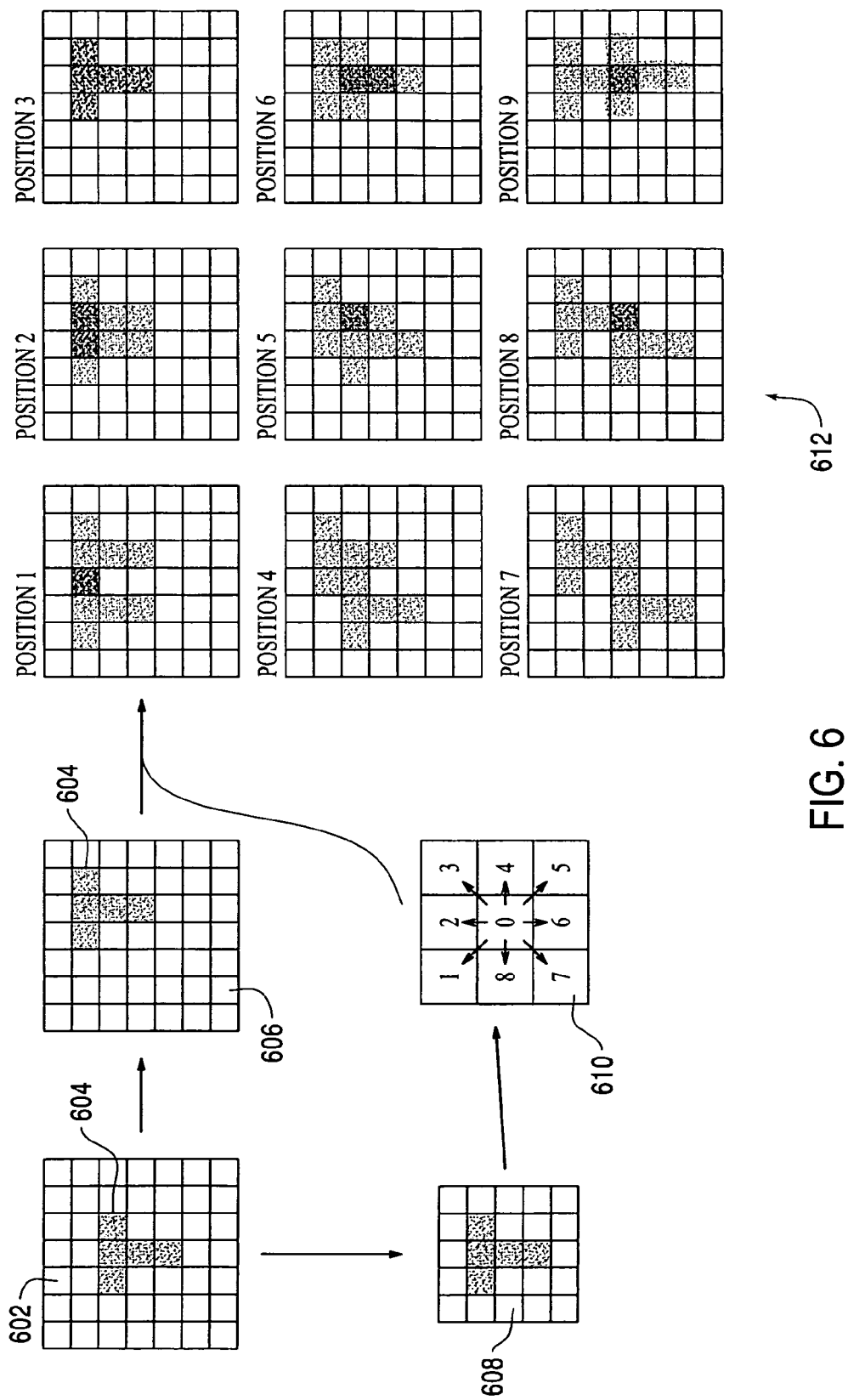
FIG. 6 is a diagrammatic representation of the correlation process flow described in FIG. 5.

FIG. 6 is a diagrammatic representation of one exemplary embodiment of the correlation process flow described with respect to FIG. 5. Correlation processing compares the positions of inherent structural features captured in successive frames to provide information related to the position of a slippage monitoring sensor optical fiber relative to an initial position represented by a reference frame image.

The processing of FIG. 6 is typically performed for each slippage monitoring sensor optical fiber. While the correlation processing is performed computationally, the concepts of this exemplary embodiment may be described diagrammatically. As shown in FIG. 6, a reference frame 602 is shown as having an image of a T-shaped inherent structural feature 604. The size of the reference frame depends upon factors such as the maximum processing speeds of the sensor and controller/processor devices, the dominant spatial frequencies in the imaging of the structural features, and the image resolution of the sensor. For example, a reference frame that is 24 by 56 pixels in size may be used in association with an image sensor or CCD that creates a thirty-two pixel (N) by sixty-four pixel (M) image.

At a later time (dt) the controller/processor module will instruct the slippage monitoring sensor module sample frame 606. If tire-to-surface slippage has occurred during the period between generate images, sample frame 606 may be displaced with respect to frame 602, but show substantially the same inherent structural features. The duration dt may be set such that the relative displacement of the inherent structural features is less than one pixel of the slippage monitoring sensor optical fiber.

If tire-to-surface slippage has occurred during the time period between acquiring the reference frame 602 and acquiring the sample frame 606, the first and second images of the inherent structural features will be ones in which the feature has shifted. While the exemplary embodiment is one in which dt is less than the time that allows a full-pixel movement, the schematic representation of FIG. 6 is one in which the representative feature 604 is allowed to shift up and to the right by one pixel. The full-pixel shift is assumed only to simplify the representation.

Figure 8:
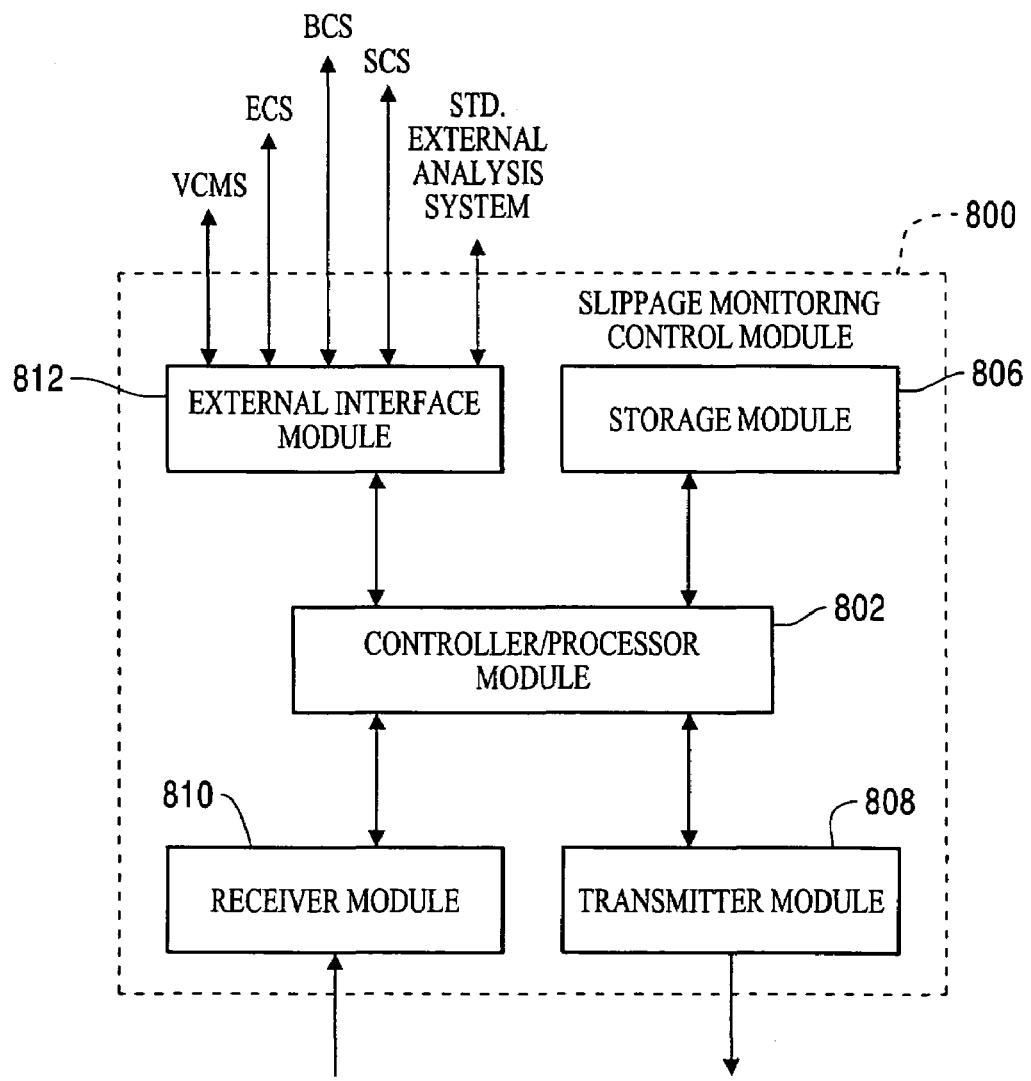
FIG. 8 is a modular block diagram of a slippage monitoring control module in accordance with an exemplary embodiment of the present invention.

Element 610 in FIG. 8 represents a sequential shifting of the pixel values of frame 608 into the eight nearest-neighbor pixels. That is, step "0" does not include a shift, step "1" is a diagonal shift upward and to the left, step "2" is an upward shift, etc. In this manner, the pixel-shifted frames can be combined with the sample frame 606 to produce the array 612 of position frames. The position frame designated as "Position 0" does not include a shift, so that the result is merely a combination of frames 606 and 608. "Position 3" has the minimum number of shaded pixels, and therefore is the frame with the highest correlation. Based upon the correlation results, the position of the T-shaped feature 604 in the sample frame 606 is determined to be a diagonal rightward and upward shift relative to the position of the same feature in earlier-acquired reference frame 62, which implies that the tire has slipped leftwardly and downwardly during time dt.

While other correlation approaches may be employed, an acceptable approach is a "sum of the squared differences" correlation. For the exemplary embodiment of FIG. 6, there are nine correlation coefficients ($C_k=C_0, C_1 \ldots C_8$) formed from the nine offsets at element 610, with the correlation coefficients being determined by equation:

$$C_k = \sum_i \sum_j (S_{ij} - R_{(ij)+k})^2$$

where $S_{ij}$ denotes the slippage monitoring sensor module measured value at the position ij of the sample frame 606 and $R_{ij}$ denotes the slippage monitoring sensor module measured value at the frame 608 as shifted at the element 610 in the k direction, with k being the identifier of the shift at element 610. In FIG. 6, k=3 provides the correlation coefficient with the lowest value.

Correlations are used to find the locations of identical features in successive frames in order to determine the displacements of the features from frame-to-frame. Summing or integrating these displacements and correcting for scale factors introduced through the design of the relevant optics determine the tire-to-surface slippage displacements during the slippage monitoring process.

As previously noted, the frame-to-frame correlations may be referred to as "microsteps," since frame rates are chosen to be sufficiently high to ensure that the displacements do not exceed the dimension of a single pixel. Oversampling can provide sub-pixel displacement precision. Referring to FIG. 5, a determination at step S508 that a microstep is to be taken is made following each computation at step S506 of the correlations. If a microstep is required, the reference frame is shifted at step S516. In this step, the sample frame 606 of FIG. 6 becomes the reference frame and a new sample frame is acquired. The correlation computation is then repeated.

While the process provides a high degree of correlation match, any errors that do occur will accumulate with each successive shift, at step S516, of a sample frame 606 to the reference frame designation. In order to place a restriction on the growth rate of this "random walk" error, a sample frame may be stored in a separate buffer memory. This separately stored sample frame becomes a new reference frame for a subsequent series of correlation computations. The latter correlation may be referred to as a "macrostep."

By using macrosteps, a more precise determination of slippage monitoring sensor optical fiber displacement across a distance of m image frame displacements, i.e. m microsteps, can be obtained. The error in one macrostep is a result of a single correlation calculation, whereas the equivalent error of m microsteps is $m^{1/2}$ times the error in a single microstep. Although the average of errors in m microsteps approaches zero as m increases, the standard deviation in the average of errors grows as $m^{1/2}$. Thus, it is advantageous to reduce the standard deviation of accumulated error by using macrosteps having m as large as practical, as long as the two frames that define a macrostep are not so far spaced from one another that they have no significant region of common image content.

As described in FIG. 5 with respect to step S514, the sampling period dt does not have to be constant. The sampling period may be determined as a function of previous measurements. One method that employs a variable dt is to improve the accuracy of displacement calculation by keeping the relative displacement between successive reference frames within certain bounds. For example, the upper bound may be one-pixel displacement, while the lower bound is determined by numerical round-off considerations in the processing of the correlation data.

Figure 7:
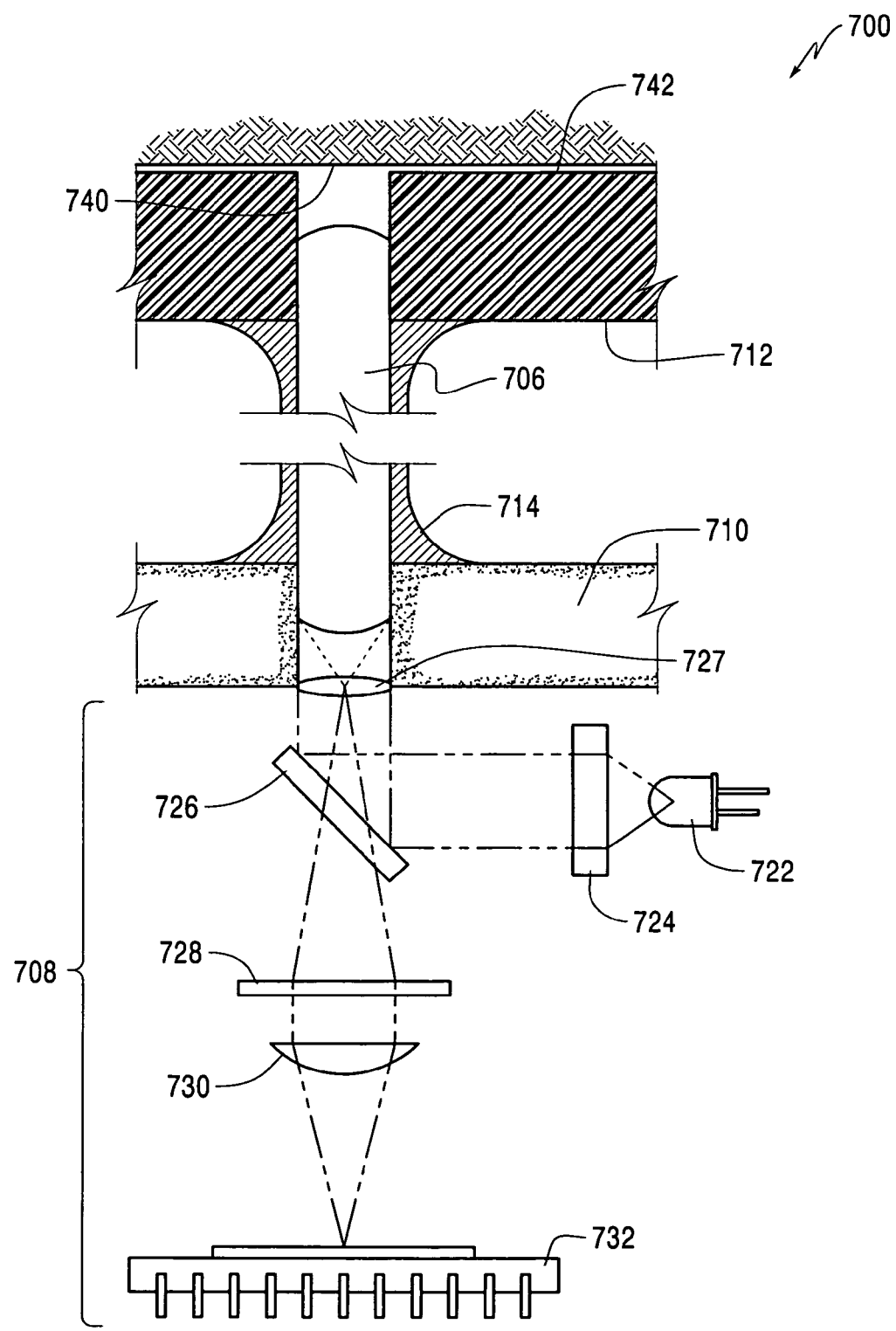
FIG. 7 is a schematic view of a slippage monitoring sensor module in accordance with an exemplary embodiment of the present invention.

FIG. 7 is a schematic view of a slippage monitoring sensor module 700 as described in FIG. 4 with respect to block 404. As shown in FIG. 7, light from a source 722 is collimated at illumination optics 724 and then redirected by an amplitude splitting beam-splitter 726 and focused by lens 727 for transmission via slippage monitoring sensor optical fiber 706 to illuminate a portion of the road surface 740 in contact with an outside surface 742 of a tire. A portion of the light energy from the LED direct to and transmitted through the beam-splitter is not shown in FIG. 7. The light energy from the beam-splitter illuminates the road surface 740 at a normal angle.

Also represented in FIG. 7 is the portion of the light energy that is reflected or scattered from road surface 740 and passed via slippage monitoring sensor optical fiber 706 through focusing lens 727 to the beam-splitter 726 for filtering at element 728 and focusing via element 730 to form an image upon imaging device 732 (e.g., a CCD). The portion of light energy passing from the road surface to the beam-splitter and reflecting from the beam-splitter is not shown. The magnification of correlation imaging optics should be constant over the field-of-view of the two-dimensional imaging device 732 which detects the focused light. Further, the optics should be configured so that the road surface image remains in focus despite significant-wear to the outside tread of the tire. Alternately, the optics should be capable of being periodically and/or dynamically re-focusing to accommodate tire tread wear.

Slippage monitoring sensor module 700 may also be configured to work with the slippage monitoring module (see FIG. 4) to determine the amount of tread wear that has occurred on the tire tread. In one exemplary embodiment, slippage monitoring sensor module 700 records at sensor array 732 a time of arrival of light emitted by light source 722 and reflected off road surface 742 prior to detection at imaging device 732. By comparing the time of arrival to a time at which a pulse of light was initiated, a total propagation time may be determined. By comparing a recently measured total propagation time with a previously measured and stored total propagation time, a change in the total propagation time may be determined that excludes delays introduced by the respective hardware components. This determined change in propagation time may then be used to determine a change in the overall distance that the light has been propagated between the two different measurements. This change in propagation distance equates to the wear in the tread of the tire since the stored measurement was made.

By comparing the determined measure of tire tread wear with a previously stored tread depth value received from an external system or a previously measured tread depth measured by a user and stored in memory, slippage monitoring sensor module 700 may determine the depth of the tread remaining on the tire. In one exemplary embodiment, slippage monitoring sensor module 700 is configured via communication with an external module (e.g., the slippage monitoring control module) with the information needed to periodically determine the depth of tread remaining on the tire and to report to the external module when one or more predetermined tired tread thresholds have been exceeded. It should be noted that light source 722 may emit infrared light but could be modified to emit any light frequency. Further, it should be noted that unless a surface is in contact with the tired tread opposite a slippage monitoring sensor optical fiber, no reflection can occur and no frame with information related to the surface can be generated. Slippage monitoring sensor module may be configured to only generate frames when reflected light above a pre-selected or dynamically selected threshold is detected. Such an approach may be used to assure that frames are generated only for slippage monitoring sensor optical fibers within a tire footprint in contact with a surface.

FIG. 8 presents a block diagram of an exemplary embodiment of a slippage monitoring control module 800 that communicates with one or more slippage monitoring modules (FIG. 4) to disseminate control information to the respective slippage monitoring modules and to process and disseminate tire-to-surface slippage information received from the respective slippage monitoring modules.

As shown in FIG. 8, slippage monitoring control module 800 may include a controller/processor module 802, a storage module 806, a transmitter module 808, a receiver module 810 and an external interface module 812.

In one exemplary embodiment, slippage monitoring control module 800 receives via receiver module 810 correlation information from one or more slippage monitoring modules, each supporting one or more slippage monitoring sensor modules. In such an exemplary embodiment, controller/processor module 802 may process information received with respect to each slippage monitoring sensor module to determine the distance and direction (e.g., in terms of ΔX and ΔY coordinates) of a detected slippage. Controller/processor module 802 may further process the information received from the slippage monitoring sensor modules to determine which tires are slipping and the direction in which each tire is slipping. Depending upon the severity of the slipping detected, controller/processor module 802 may identify an alert condition that corresponds to a corrective action that may be initiated to correct the slippage and a magnitude of the correction needed.

Controller/processor module 802 may store the slippage information received and/or generated in storage module 806. Further, controller/processor module 802 may forward, via external interface module 812 received and/or generated slippage information and/or generated alerts to an external analysis system and/or to one or more external vehicle control modules capable of implementing corrective action. As shown in FIG. 8, slippage monitoring control module 800 is capable of interfacing with a standard external analysis system. Further, as shown in FIG. 8, slippage monitoring control module 800 is capable of interfacing with a vehicle control management system, an engine control system, a breaking control system and a stability control system. Each of these respective external modules may be configured to receive tire-to-surface slippage information and alerts generated by slippage monitoring control module 800 and to implement corrective action.

As further shown in FIG. 8, slippage monitoring control module 800 may receive information from external systems. This received information may include control parameters and/or configuration data that controls how slippage monitoring control module 800 is to communicate with the respective external devices (e.g., periodically, in real-time, on an alert-only basis, etc.) and the information that each external module expects to receive (e.g., slippage measurements per tire, alert codes with severity indicators, etc.). The received information may also include configuration and command/control instructions used by the slippage monitoring control module 800 to manage the respective slippage monitoring modules and to manage in information generated by the respective slippage monitoring modules. For example, in one exemplary embodiment, vehicle speed information received from a vehicle control management system may be used to determine an initial frame sampling rate used by the respective slippage monitoring modules. Information received from external systems may be dynamically or statically stored in storage module 806. In this manner the configuration information received from external systems may remain either temporarily or permanently available for use in configuring/controlling slippage monitoring control module 800 operation and the manner in which slippage monitoring control module 800 communicates with external systems.

Figure 9:
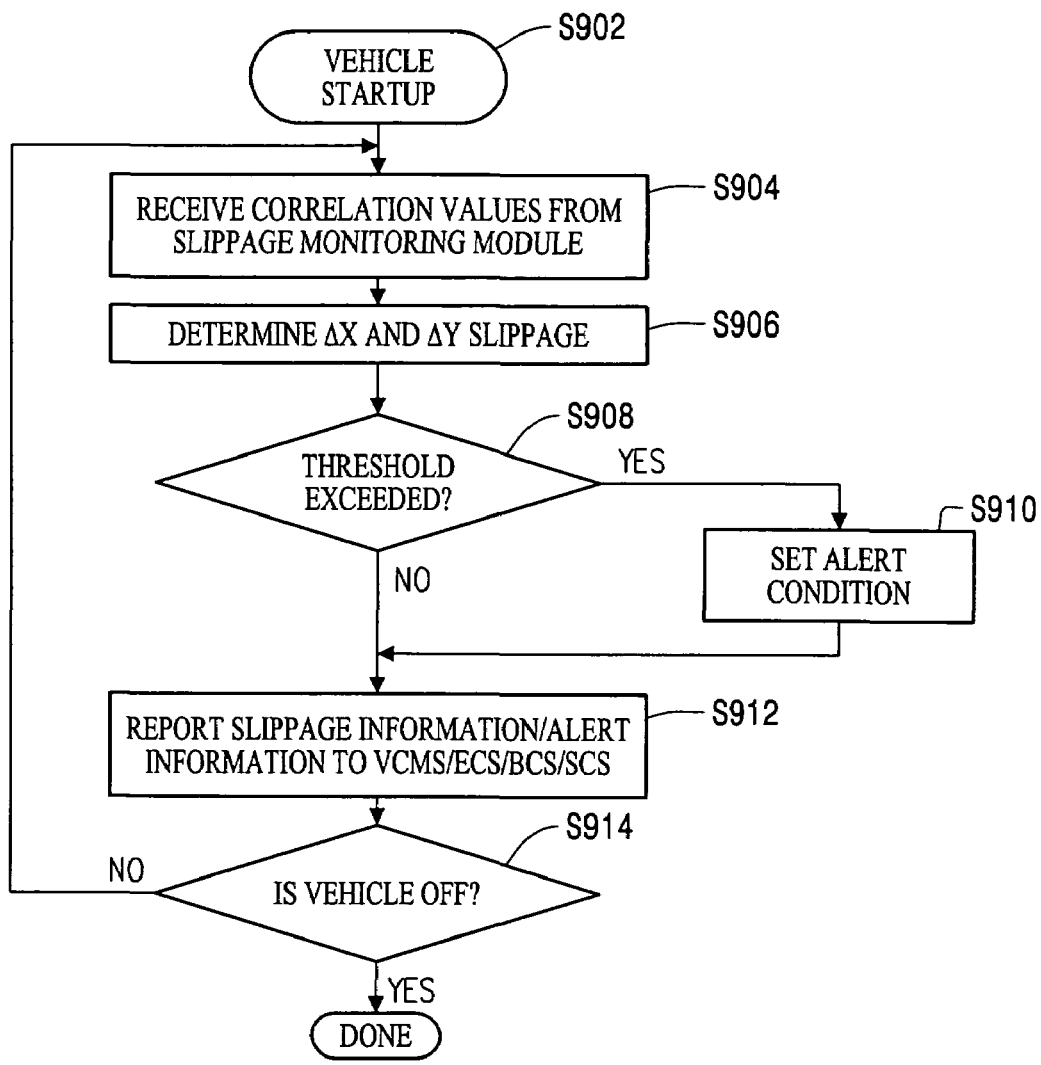
FIG. 9 is a process flow diagram describing a process used by a slippage monitoring control module to determine an amount of tire/vehicle slippage in accordance with an exemplary embodiment of the present invention.

FIG. 9 is a process flow diagram describing a process used by a slippage monitoring control module 800 (FIG. 8) to determine and report an amount of tire/vehicle slippage. As shown in FIG. 9, after startup of a vehicle, at step S902, the slippage monitoring control module may receive correlation values from one or more slippage monitoring modules, at step S904. Based upon the received correlation values, the slippage monitoring control module may determine, at step S906, an amount of change in an X direction and an Y direction (i.e., a ΔX/ΔY) for each slippage monitoring sensor optical fiber location, and may determine additional qualitative information that characterizes the nature of the measured slippage for one or more tires. If the slippage monitoring control module determines, at step S908 that a performance threshold has been exceeded, an alert condition may be generated and associated with the slippage information at step S910. Next, the slippage monitoring control module may report, at step S912, the slippage information and/or alert data to one or more external modules (e.g., a vehicle control management module, an engine control management system, a breaking control system, stability control system, etc.) so that corrective action may be taken based upon the nature of the detected slippage information and the corrective capabilities of the vehicle. Upon turning off the vehicle, at step 914, process flow terminates, otherwise processing continues with the receipt and processing of further correlation values at step S904.

Figure 10:
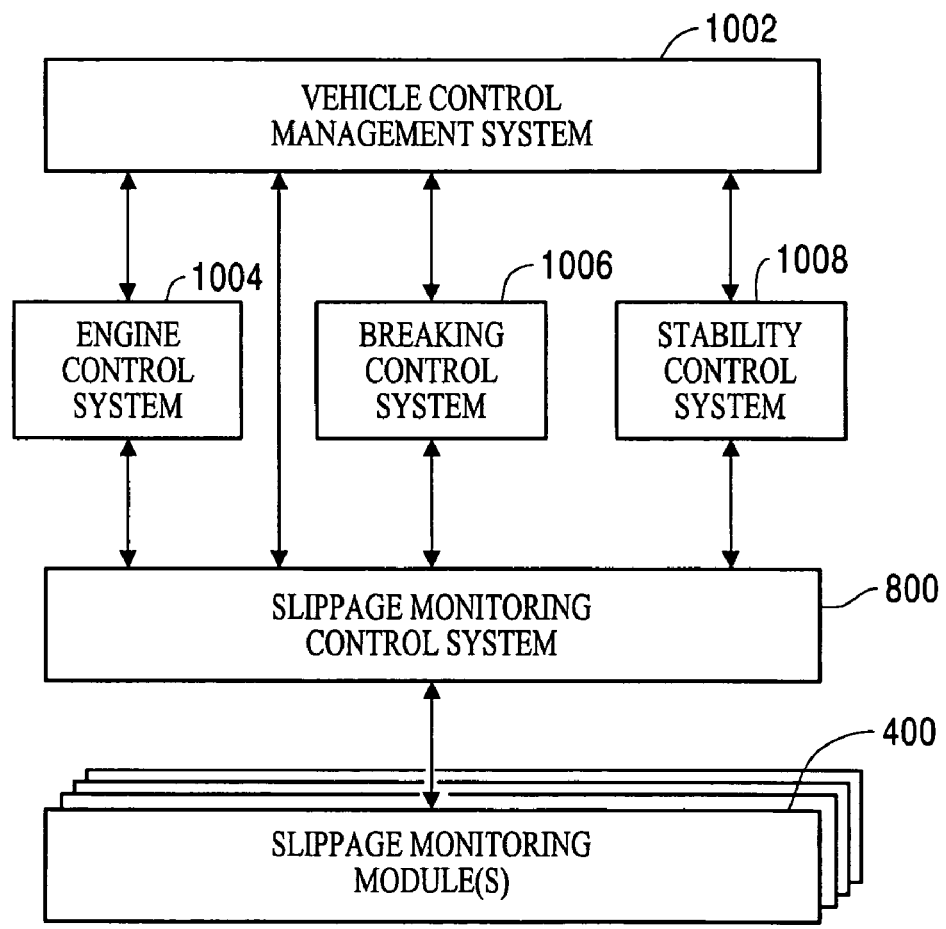
FIG. 10 is a modular block diagram of a vehicle control management system with integrated slippage monitoring in accordance with an exemplary embodiment of the present invention.

FIG. 10 is a modular block diagram of a vehicle control management system with integrated slippage monitoring. The identified control systems depicted in FIG. 10 have been described above in connection with the slippage monitoring control module. As shown in FIG. 10, a exemplary vehicle with sophisticated electronic controls may include a vehicle control management system 1002, an engine control system 1004, a breaking control system 1006, and a stability control system 1008, each capable of automated monitoring and control of one or more aspects of a vehicle. As described above, each of these control systems has typically been limited by a lack of timely and accurate tire-to-surface slippage information. By integrating one or more of these control systems with an exemplary embodiment of a slippage monitoring control system 800 (see FIG. 8) that is in communication with one or more slippage monitoring modules 400 (see FIG. 4) each of the respective control modules may be provided with accurate tire-to-surface slippage information that the respective vehicle control modules may use to better manage operation of the vehicle.

Figure 11:
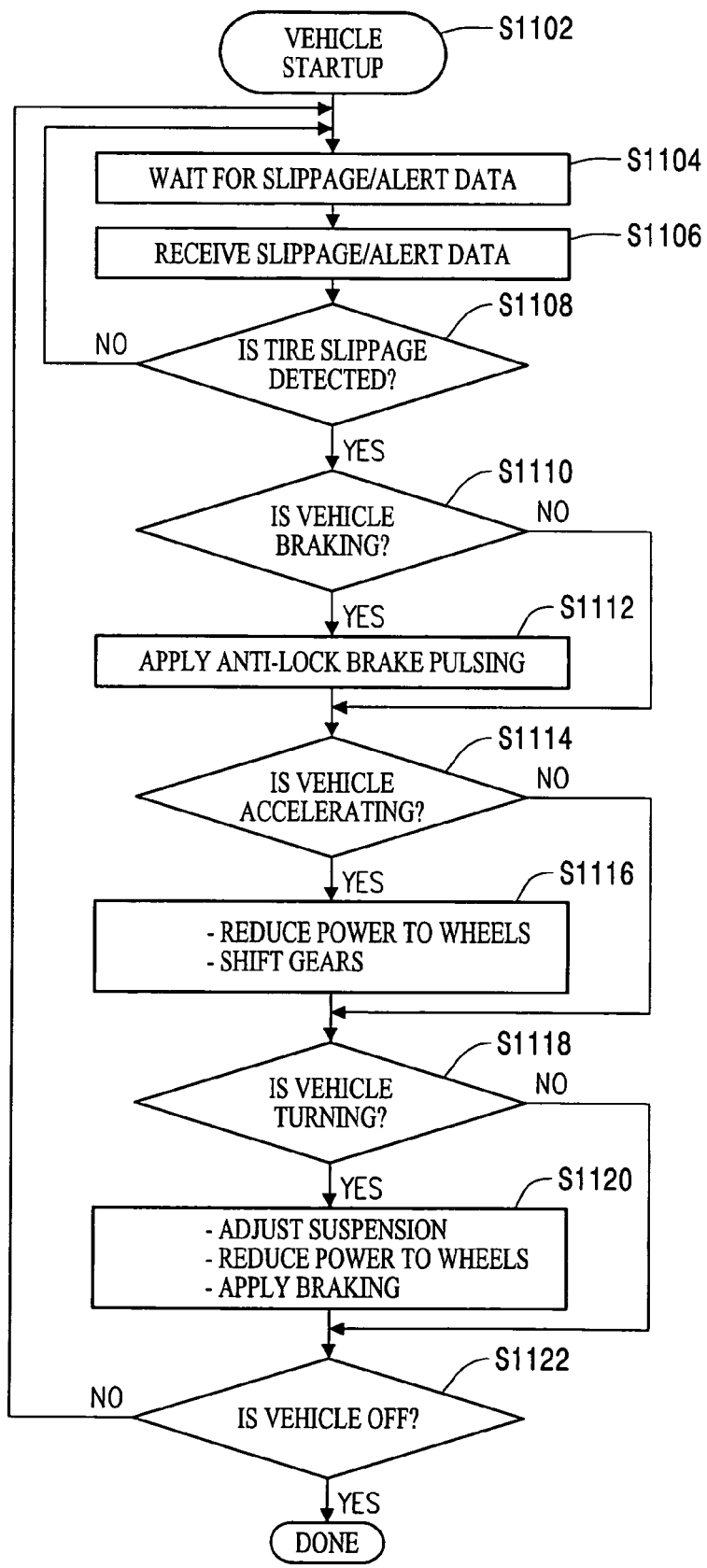
FIG. 11 is a process flow diagram describing a process used by a vehicle control management system with integrated slippage monitoring to optimize vehicle performance using tire-to-surface slippage information in accordance with an exemplary embodiment of the present invention.

FIG. 11 is a process flow diagram that describes a process that may be used by a vehicle control management system with integrated slippage monitoring to optimize vehicle performance using tire-to-surface slippage information. As shown in FIG. 11, upon startup of a vehicle, at step S1102, a vehicle control management module may wait, at step S1104, for slippage/alert data from an integrated slippage monitoring control module 800 (see FIG. 8). Upon receipt, at steps 1106, of slippage/alert data, the vehicle control management module determines, at steps 1108 whether tire slippage has been detected. If no slippage has been detected, processing returns to step S1104 to wait for the next slippage date update. If slippage is detected, at step S1108, the vehicle control management module may determine, at step S1110, whether the vehicle is breaking, and if so, the vehicle control management module may instruct, at step S1112, the breaking control system to take corrective action (e.g., apply anti-lock brake pulsing, etc.). Next, at step S1114, the vehicle control management module may determine whether the vehicle is accelerating, and if so, the vehicle control management module may instruct, at step S1116, the engine control system to take corrective action (e.g., reduce power to the wheels, shift gears, etc.). Next, at step S1118, the vehicle control management module may determine whether the vehicle is turning, and if so, the vehicle control management module may instruct, at step S1120, the vehicle stability control system to take corrective action (e.g., adjust the vehicle's dynamic suspension, reduce power to the wheels, apply breaks, etc.). Upon turning off the vehicle, at step S1122, the process flow terminates, otherwise processing continues at step S104 and the vehicle control management module may proceed to wait for further tire-to-surface slippage information from the integrated slippage monitoring control module.

It will be appreciated that the exemplary embodiments described above and illustrated in the drawings represent are only a few of the many ways of generating and applying tire-to-surface slippage information for use in improving tire designs and overall vehicle performance. The present invention is not limited to the specific applications disclosed herein, but may be applied to any field that would benefit from accurate and timely tire-to-surface slippage information.

The tire-to-surface slippage monitoring system may be implemented in any number of modules and is not limited to the module architecture described above. Each module may be implemented in any number of ways and are not limited in implementation to execute process flows precisely as described above. The tire-to-surface slippage monitoring system processes described above and illustrated in the flow charts and diagrams may be modified in any manner that accomplishes the functions described herein.

It is to be understood that various functions of the tire-to-surface slippage monitoring system method and apparatus may be distributed in any manner among any quantity (e.g., one or more) of hardware and/or software modules or units, computer or processing systems or circuitry.

Tire-to-surface slippage monitoring system module(s) may be integrated within a stand-alone system or may execute separately and be coupled to any number of external analysis systems and/or vehicle control systems via any communications medium (e.g., network, modem, direct connection, etc.). The tire-to-surface slippage monitoring system process can be implemented by any quantity of devices and/or any quantity of processing systems, including Application Specific Integrated Circuit (ASIC), Field Programmable Gate Array (FPGA), Digital Signal Processor (DSP) or similar device to produce tire-to-surface slippage information and to communicate between the respective tire-to-surface slippage monitoring system modules and/or to communicate with external systems.

It is to be understood that the software of the tire-to-surface slippage monitoring system process may be implemented in any desired computer language, and could be developed by one of ordinary skill in the computer and/or programming arts based on the functional description contained herein and the flow charts illustrated in the drawings. For example, in one exemplary embodiment the tire-to-surface slippage monitoring system process can be written using the C+ programming language, however, the present invention is not limited to being implemented in any specific programming language. The various modules and data sets may be stored in any quantity or types of file, data or database structures. Moreover, the tire-to-surface slippage monitoring system software may be distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

The format and structure of internal structures used to hold intermediate information in support of the tire-to-surface slippage monitoring system process can include any and all structures and fields and are not limited to files, arrays, matrices, status and control booleans/variables.

The tire-to-surface slippage monitoring system software may be installed and executed on a processing system in any conventional or other manner (e.g., an install program, copying files, entering an execute command, etc.). The functions associated with a the tire-to-surface slippage monitoring system may be performed on any quantity of processing devices. Further, the specific functions may be assigned to one or more of the processing devices in any desired fashion.

The tire-to-surface slippage monitoring system process may accommodate any quantity and any type of data set files and/or databases or other structures containing stored data sets, measured data sets and/or residual data sets in any desired format (e.g., ASCII, plain text, any word processor or other application format, etc.).

Tire-to-surface slippage monitoring system output can be presented to the user in any manner using numeric and/or visual presentation formats. Tire-to-surface slippage monitoring system output can be presented as input to a numerical analysis tool in either numeric or visual form and can be processed by the numerical analysis tool in any manner and/or using any number of threshold values and/or rule sets. For example, a technician can visually interpret tire-to-surface slippage monitoring system results via direct inspection of the tire-to-surface slippage monitoring system numeric output, inspection of a graph or chart depicting tire-to-surface slippage information and/or via an animated recreation of a tire or vehicle slipping based upon the generated tire-to-surface slippage information.

Further, any references herein to software performing various functions generally refer to computer systems or processors performing those functions under software control. The computer system may alternatively be implemented by hardware or other processing circuitry. The various functions of the tire-to-surface slippage monitoring system process may be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, etc.). The software and/or processes described above and illustrated in the flow charts and diagrams may be modified in any manner that accomplishes the functions described herein.

The slippage monitoring sensor described above may include any sensor capable of generating a reference frame and a sample frame and is not limited to an optical fiber based sensor. For example, exemplary embodiments of a slippage monitoring sensor may emit any form of electromagnetic and/or acoustic energy and may generate reference frames and sample frames based upon the reflected electromagnetic and/or acoustic energy. Such exemplary embodiments would not require an optical fiber path to the outer surface of the tire, and reduce the mechanical complexity of the sensor. For example, one exemplary embodiment may use radar or sonar based techniques to generate reference frames and sample frames based upon electromagnetic and/or acoustic energy that non-destructively penetrates the tire material.

A reference frame and a sample frame may be any representation of a surface in contact with a portion of the tire footprint contact area that may be compared in any manner using any technique to determine whether slippage has occurred. Reference frames and sample frames are not limited to pixilated images but may include any storable measured response capable of being processed to assess tire-to-surface slippage.

The above exemplary embodiments are exemplary only. The present invention should be interpreted to include any implementation of the described capability implemented using any existing, related or future developed technologies.

From the foregoing description it will be appreciated that the present invention includes a novel a method and apparatus for monitoring the performance of a tire by generating accurate, timely tire-to-surface slippage information under any operational/environmental conditions and on any road and/or off-road surface without requiring instrumentation of the roadway.

Having described exemplary embodiment of a tire performance surface slippage monitoring system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method for controlling slippage of a vehicle, comprising:
   generating tire slippage information for at least one tire on the vehicle; and
   processing the generated tire slippage information to determine a measure of vehicle slippage;
   wherein the tire slippage information for the at least one tire is based upon a comparison of a generated reference frame of a surface opposite a tire contact area with a subsequently generated sample frame of the surface opposite the tire contact area to determine an amount and a direction of slippage between the tire contact area and the surface.

2. The method of claim 1, further comprising:
   reducing power to a vehicle based, at least in part, upon at least one of the tire slippage information and the measure of vehicle slippage.

3. The system of claim 1, further comprising:
   applying brakes to a vehicle based, at least in part, upon at least one of the tire slippage information and the measure of vehicle slippage.

4. The system of claim 1, further comprising:
   adjusting a vehicle suspension based, at least in part, upon at least one of the tire slippage information and the measure of vehicle slippage.

5. A vehicle slippage control system, comprising:
   at least one tire slippage monitoring module that generates tire slippage information; and
   a slippage monitoring control system that communicates with the at least one tire slippage monitoring module to receive the generated tire slippage information and that processes the received tire slippage information to determine a measure of vehicle slippage;
   wherein the at least one tire slippage monitoring module generates tire slippage information based upon a comparison of a generated reference frame of a surface opposite a tire contact area with a subsequently generated sample frame of the surface opposite the tire contact area to determine an amount and a direction of slippage between the tire contact area and the surface.

6. The system of claim 5, further comprising:
   an engine control system that reduces power to a vehicle based, at least in part, upon information received from the slippage monitoring control system.

7. The system of claim 5, further comprising:
   a breaking control system that applies braking to a vehicle based, at least in part, upon information received from the slippage monitoring control system.

8. The system of claim 5, further comprising:
   a stability control system that adjusts a vehicle suspension based, at least in part, upon information received from the slippage monitoring control system.

9. The system of claim 5, further comprising:
   a vehicle control management system that controls operation of a vehicle based, at least in part, upon information received from the slippage monitoring control system.

10. The system of claim 9, further comprising at least one of:
    an engine control system that reduces power to a vehicle based, at least in part, upon information received from the vehicle control management system;
    a breaking control system that applies braking to a vehicle based, at least in part, upon information received from the vehicle control management system; and
    a stability control system that adjusts a vehicle suspension based, at least in part, upon information received from the vehicle control management system.

* * * * *